US011979465B2

(12) United States Patent
Lewis et al.

(10) Patent No.: US 11,979,465 B2
(45) Date of Patent: *May 7, 2024

(54) RECOMMENDING MEDIA CONTENT TO A USER BASED ON INFORMATION ASSOCIATED WITH A REFERRAL SOURCE

(71) Applicant: Google LLC, Mountain View, CA (US)

(72) Inventors: Justin Lewis, South San Francisco, CA (US); Kevin Greene, San Francisco, CA (US)

(73) Assignee: Google LLC, Mountain View, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/222,340

(22) Filed: Apr. 5, 2021

(65) Prior Publication Data
US 2021/0227045 A1 Jul. 22, 2021

Related U.S. Application Data

(63) Continuation of application No. 15/383,740, filed on Dec. 19, 2016, now Pat. No. 10,972,578, which is a
(Continued)

(51) Int. Cl.
*H04L 67/306* (2022.01)
*H04L 51/52* (2022.01)
(Continued)

(52) U.S. Cl.
CPC ............ *H04L 67/306* (2013.01); *H04L 51/52* (2022.05); *H04L 65/612* (2022.05); *H04L 67/52* (2022.05);
(Continued)

(58) Field of Classification Search
CPC ............... G06Q 50/01; G06Q 30/0631; G06Q 30/0255; G06Q 30/0261; G06F 16/9535;
(Continued)

(56) References Cited

U.S. PATENT DOCUMENTS 4,996,642 A 2/1991 Hey
5,553,289 A 9/1996 Johnson et al.
(Continued)

OTHER PUBLICATIONS

G. Adomavicius and A. Tuzhilin, "Toward the next generation of recommender systems: a survey of the state-of-the-art and possible extensions," in IEEE Transactions on Knowledge and Data Engineering, vol. 17, No. 6, pp. 734-749, Jun. 2005, doi: 10.1109/TKDE.2005.99. (Year: 2005).*
(Continued)

*Primary Examiner* — Andrew L Tank
(74) *Attorney, Agent, or Firm* — Shumaker & Sieffert, P.A.

(57) ABSTRACT

Systems and methods for recommending media content to a user based on information associated with a referral source that referred the user to a media item provided by a source of the media content are presented. In one or more aspects, a system is provided that includes a presentation component that presents, via user a interface, a first media item associated with a media presentation source referred to a user through a referral source. The system further includes an analytics component that identifies a second media item based on media items associated with the media presentation source that are referred to other users through the referral source, and a recommendation component that recommends the second media item to the user through the user interface.

18 Claims, 14 Drawing Sheets

Related U.S. Application Data continuation of application No. 13/913,105, filed on Jun. 7, 2013, now Pat. No. 9,560,159.

(51) Int. Cl.

| | | |
|---|---|---|
| *H04L 65/612* | (2022.01) | |
| *H04L 67/01* | (2022.01) | |
| *H04L 67/50* | (2022.01) | |
| *H04L 67/52* | (2022.01) | |
| *H04L 67/55* | (2022.01) | |
| *H04L 67/60* | (2022.01) | |
| *G06F 3/0482* | (2013.01) | |

(52) U.S. Cl.
CPC ............ *H04L 67/535* (2022.05); *H04L 67/55* (2022.05); *H04L 67/60* (2022.05); *G06F 3/0482* (2013.01); *H04L 67/01* (2022.05)

(58) Field of Classification Search
CPC .............. G06F 16/438; G06F 16/4387; G06F 16/4393; G06F 16/638; G06F 16/639; G06F 16/248; G06F 16/637; G06F 16/635; G06F 16/958; G06F 16/972; G06F 16/955; G06F 16/9558; G06F 16/9566; G06F 3/0482; H04L 51/52; H04L 67/306; H04L 67/535; H04L 67/52; H04L 67/60; H04L 65/612; H04L 67/55; H04L 67/01; H04N 21/4532; H04N 21/252; H04N 21/44226; H04W 4/21
See application file for complete search history.

(56) References Cited

U.S. PATENT DOCUMENTS

| | | | |
|---|---|---|---|
| 6,031,795 | A | 2/2000 | Wehmeyer |
| 7,853,622 | B1 | 12/2010 | Baluja et al. |
| 7,908,183 | B2 | 3/2011 | Jacobi et al. |
| 7,953,777 | B2 | 5/2011 | White et al. |
| 8,099,315 | B2 | 1/2012 | Amento et al. |
| 8,112,720 | B2 | 2/2012 | Curtis |
| 8,311,382 | B1 | 11/2012 | Harwell et al. |
| 8,359,303 | B2 | 1/2013 | Du et al. |
| 8,484,203 | B1 | 7/2013 | Clancy et al. |
| 8,489,515 | B2 | 7/2013 | Mathur |
| 8,825,574 | B2 | 9/2014 | Bodor et al. |
| 8,843,430 | B2 * | 9/2014 | Jojic ............... G06Q 30/02 705/26.7 |
| 8,984,072 | B2 | 3/2015 | Sadja et al. |
| 9,171,326 | B2 | 10/2015 | Pavlidis et al. |
| 9,460,092 | B2 | 10/2016 | Murphy et al. |
| 9,560,159 | B1 | 1/2017 | Lewis et al. |
| 9,710,436 | B1 * | 7/2017 | Bandaru ............... G06F 16/958 |
| 10,972,578 | B2 | 4/2021 | Lewis et al. |
| 2005/0262217 | A1 | 11/2005 | Nonaka et al. |
| 2006/0174277 | A1 | 8/2006 | Sezan et al. |
| 2006/0195790 | A1 | 8/2006 | Beaupre et al. |
| 2006/0282856 | A1 | 12/2006 | Errico et al. |
| 2007/0028266 | A1 | 2/2007 | Traijkovic et al. |
| 2008/0133593 | A1 | 6/2008 | Clark |
| 2008/0134043 | A1 | 6/2008 | Georgis et al. |
| 2008/0301186 | A1 | 12/2008 | Svendsen |
| 2009/0164429 | A1 | 6/2009 | Svendsen et al. |
| 2009/0327193 | A1 | 12/2009 | Eronen et al. |
| 2011/0060998 | A1 | 3/2011 | Schwartz et al. |
| 2011/0238754 | A1 | 9/2011 | Dasilva et al. |
| 2011/0258154 | A1 | 10/2011 | Koppula |
| 2011/0270703 | A1 | 11/2011 | Engle |
| 2012/0030586 | A1 | 2/2012 | Ketkar |
| 2012/0054666 | A1 | 3/2012 | Baird-Smith et al. |
| 2012/0066211 | A1 * | 3/2012 | Gandhi ............... G06F 16/951 707/723 |
| 2012/0072852 | A1 | 3/2012 | Svendsen et al. |
| 2012/0159337 | A1 | 6/2012 | Travilla et al. |
| 2012/0233212 | A1 | 9/2012 | Newton et al. |
| 2012/0254152 | A1 | 10/2012 | Park et al. |
| 2012/0290446 | A1 | 11/2012 | England et al. |
| 2013/0086063 | A1 | 4/2013 | Chen et al. |
| 2013/0086159 | A1 | 4/2013 | Gharachorloo et al. |
| 2013/0198633 | A1 | 8/2013 | Hyman |
| 2014/0012895 | A1 | 1/2014 | Lieberman et al. |
| 2014/0196100 | A1 | 7/2014 | Alexandersson et al. |
| 2014/0281978 | A1 | 9/2014 | Ye et al. |

OTHER PUBLICATIONS

Notice of Allowance dated Sep. 23, 2016 in U.S. Appl. No. 13/913,105.
Notice of Allowance dated Dec. 2, 2020 in U.S. Appl. No. 15/383,740.
Office Action dated Mar. 3, 2015 in U.S. Appl. No. 13/913,105.
Office Action dated Apr. 18, 2019 in U.S. Appl. No. 15/383,740.
Office Action dated Jul. 10, 2020 in U.S. Appl. No. 15/383,740.
Office Action dated Sep. 25, 2015 in U.S. Appl. No. 13/913,105.
Office Action dated Oct. 1, 2018 in U.S. Appl. No. 15/383,740.
Office Action dated Dec. 30, 2019 in U.S. Appl. No. 15/383,740.
Prosecution History from U.S. Appl. No. 13/913, 105, now issued U.S. Pat. 9,560, 159, dated Mar. 3, 2015 through Sep. 23, 2016, 84 pp.
Prosecution History from U.S. Appl. No. 15/383,740, now issued U.S. Pat. No. 10,972,578, dated Oct. 1, 2018 through Dec. 2, 2020, 111 pp.

* cited by examiner

RECOMMENDING MEDIA CONTENT TO A USER BASED ON INFORMATION ASSOCIATED WITH A REFERRAL SOURCE

CROSS-REFERENCE TO RELATED APPLICATIONS

This application is a continuation of U.S. patent application Ser. No. 15/383,740, filed Dec. 19, 2016, which is a continuation of U.S. patent application Ser. No. 13/913,105, filed Jun. 7, 2013, each of which is hereby incorporated by reference herein in its entirety.

TECHNICAL FIELD

This application generally relates to systems and methods for recommending media content to a user based on information associated with a referral source that referred the user to a media item provided by a source of the media content.

BACKGROUND

The proliferation of available streaming content is increasing at exponential levels that will soon reach many millions if not billions of such viewable streaming content. Conventionally, broadcast media has been provided by television or cable channels that typically have been provided by a relatively small number of content providers. However, with the ubiquitous nature of media creation and publishing tools, individuals are able to become productive content creators. This has resulted in exponential growth of available streaming content as well as available channels for streaming content. Although users enjoy a plethora of viewing options associated with available streaming content, the task of searching through this sea of content to find items of interest is becoming increasingly difficult. Accordingly, mechanisms for automatically identifying and recommending content that may be of interest to a user can greatly enhance user browsing and entertainment watching experience.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1A:
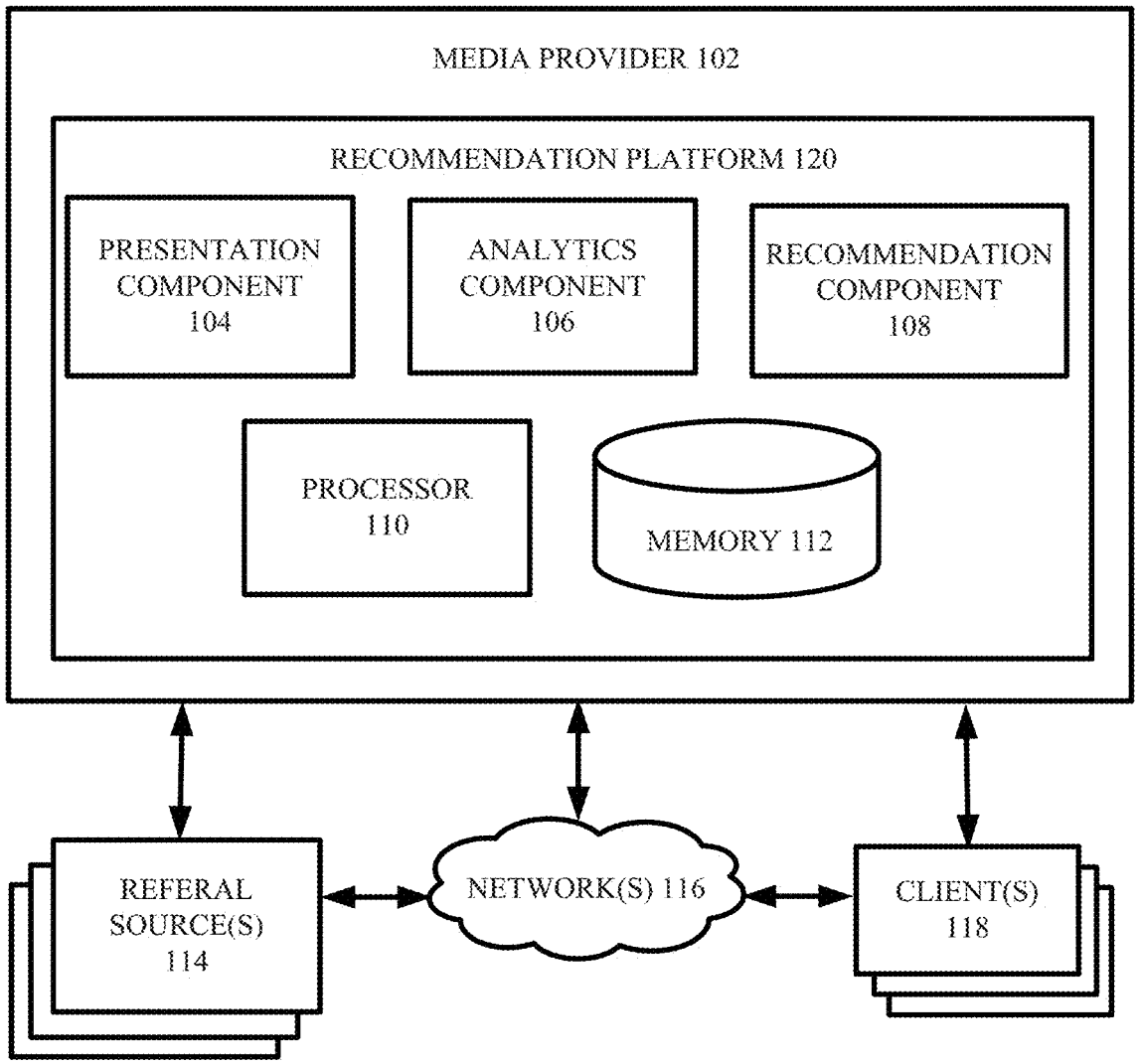
FIG. 1A illustrates an example system for recommending media content to a user based on information associated with a referral source that referred the user to a media item provided by a source of the media content, in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods for recommending media content to a user based on information associated with a referral source that referred the user to a media item provided by a source of the media content. Networked systems that employ website platforms for content distribution often present relevant content to users based on certain signals or indicators of related to preferences. These systems often attempt to generate such signals/indicators by requesting information from the users via user profiles/accounts. For example, a user can generate a profile or account that includes information related to the user's age, gender, location, interests, etc. The information provided in a user profile/account can then be used to identify content relevant to the user and to recommend this content to the user.

In addition to or in the alternative of using signals associated with user profiles/accounts, the disclosed systems look directly at a referring source to identify signals that can be employed to determine or infer relevant content for a user. For example, often times, links to videos available at a media presentation source are provided at another source, such as a social media source, an educational information source, or a business transaction source. When a user clicks on the link from one of these sources, (referred to herein as the referral source), the user will be brought to the media presentation source to view or play the video represented by the link. The disclosed systems and methods can recommend other videos to the user that are provided by the media presentation source based at least in part on information associated with the referral source that provided the link to the video. For example, the disclosed systems can examine other videos available by the media presentation source that have links at the referral source to generate a list of "More videos from Referral Source." The disclosed systems can further identify those videos having links at the referral source that were clicked on (e.g., an action referred to herein as "following a link" or "click-through") by a user of the referral source to generate a list of "More videos other users found interesting from the Referral Source." In yet another example, the disclosed systems can analyze interests of users of the referral source based on their viewing history at the media presentation source to identify videos that relate to interests of users from the referral source.

In one or more aspects, a system is provided that includes a presentation component that presents, via user a interface, a first media item associated with a media presentation source referred to a user through a referral source. The system further includes an analytics component that identifies a second media item based on media items associated with the media presentation source that are referred to other users through the referral source, and a recommendation component that recommends the second media item to the user through the user interface.

In another aspect, a method is disclosed that includes presenting, via user a interface, a first media item associated with a media presentation source referred to a user through a referral source, identifying a second media item based on media items associated with the media presentation source that are referred to other users through the referral source, and recommending the second media item to the user through the user interface.

Further provided is a tangible computer-readable storage medium comprising computer-readable instructions that, in response to execution, cause a computing system to perform various operations. These operations can include presenting, via user a interface, a first media item associated with a media presentation source referred to a user through a referral source, identifying a set of media items based on information regarding other users associated with the referral source, and recommending the set of media items to the user through the user interface.

Referring now to the drawings, with reference initially to FIG. 1A, presented is diagram of an example system 100 for recommending media content to a user based on information associated with a referral source that referred a user to a media item provided by a source of the media content, in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes a media provider 102, one or more referral sources 114, and one or more client devices 118. System 100 also includes one or more networks 116 connecting the clients 118, referral sources 114 and media provider 102. In an aspect, the media provider 102 can include a recommendation platform 120 configured to facilitate recommending media content to a user based on information associated with a referral source that referred the user to the media provider in association with a linked media item. In other aspects, (not shown), the recommendation platform 120 can be located externally from the media provider and accessed by the media provider over a network (e.g., a network 116). Recommendation platform 120 can include memory 112 for storing computer executable components and instructions. Recommendation platform 120 can further include a processor 110 to facilitate operation of the instructions (e.g., computer executable components and instructions) by the recommendation platform 120.

A media provider 102 can include an entity that provides media content to a user via a network 116 (e.g., the Internet). As used herein the term media content or media item can include but is not limited to streamable media (e.g., video, live video, video advertisements, music, music videos, sound files and etc.) and static media (e.g., pictures, thumbnails). In an aspect, a media provider 102 can employ one or more server computing devices to store and deliver media content to users that can be accessed using a browser. For example, media provider 102 can provide and present content to a user via a website. In an aspect, media provider 102 is configured to provide streamed media to users over a network 116. The media can be stored in memory 112 and/or at various servers employed by media provider 102 and accessed via a client device 118 using a website platform of the media provider 102. For example, media provider 102 can include a media presentation source that has accesses to thousands to billions (and potentially an unlimited number) of shared media (e.g., video and/or audio) files. The media presentation source can further stream these media files to one or more users at respective client devices of the one or more users over a network 116.

A referral source 114 can include an information source accessible to users via a network 116 and configured to provide a link or hyperlink to media content provided by media provider 102. For example, referral source 114 can include a networked content source that provides information to a user via a website and includes embedded links at the website to content provided by media provider 102. Example referral sources can include a social networking services website, a website that compiles photos and/or links to information found interesting to users at various other websites, a website that provides news articles and news multimedia to users, a website that complies photos, a website that provides written reviews of places and things, a website that provides products for purchasing, or a website that provides educational services and information. It should be appreciated that the types of referral sources described above are merely exemplary and that system 100 (and additional systems described herein) can be employed with a vast array of referral sources.

The term link or hyperlink refers to an object or item that serves as a reference to remote data, such as media content provided by media provider 102. Hyperlinks are used by networked computing entities (e.g., media provider 102 and referral sources 114) to link any information to any other information over a network (e.g., the Internet). A link or hyperlink can be presented to a user as text, an image, a thumbnail, or any object that is representative of the data it refers to. Links or hyperlinks to media items (e.g., videos) provided by media source 102 can be included at a referral source in various formats (e.g., incline links, anchor links, hyperlinks in hypertext markup language (HTML), hyperlinks in extensible markup language (XML), etc.).

A link can be selected by a user to present the user with the data represented by the link. The process of selecting a link by a user is referred to herein as "following" a link. The effect of following a link may vary with the hypertext system used to generate the link and may sometimes depend on the link itself. For instance, on the World Wide Web, most hyperlinks cause the target object to replace the object being displayed, but some are marked to cause the target document to open in a new window. Another possibility is transclusion, for which the link target is a document fragment that replaces the link anchor within the source document. Not only users browsing information at a referral source can follow hyperlinks. For example, hyperlinks can be followed automatically by programs. A program that traverses the hypertext, following each hyperlink and gathering all the retrieved documents is known as a Web spider or crawler.

In an aspect, a link can represent a media item (e.g., a video) and include the media item as embedded content at a referral source 114. For example, a referral source 114 can include a link to a video provided by media provider 102 where the link includes an embedded thumbnail image of the video. Selection of the embedded thumbnail image can result in the playing of the video at the referral source 114, via an embedded player, as streamed from the media provider 102. In another aspect, a link can represent a media item (e.g., a video) whereby selection of the link brings the user to the networked location or source of the media item (e.g., a location of a website employed by the media provider) to consume the media item.

In an aspect, content associated with media provider 102 (e.g., media content) and a referral source is provided to a user at a client device 118 over a network 116. A client device 118 can include any suitable computing device associated with a user and configured to interact with media provider 102, referral source 114 and/or recommendation platform 120. For example, client device 118 can include a desktop computer, a laptop computer, a television, a mobile phone, a tablet personal computer (PC), or a personal digital assistant PDA. As used in this disclosure, the terms "content consumer" or "user" refer to a person, entity, system, or combination thereof that employs system 100 (or additional systems described in this disclosure) using a client device 118. Network(s) 116 can include wired and wireless networks, including but not limited to, a cellular network, a wide area network (WAD, e.g., the Internet), a local area network (LAN), or a personal area network (PAN). For example, a client device 118 can communicate with a referral source 114 and media provider 102 (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks. For example, a client device 118 can access and receive media from media provider 102 over a LAN while the media provider 102 communicates with a remote recommendation platform 120 (not depicted) over a WAN.

In order to facilitate recommending media content to a user based on information associated with a referral source 114 that referred the user to a media item provided by media provider 102, recommendation platform 120 can include presentation component 104, analytics component 106, and recommendation component 108.

Presentation component 104 is configured to present media items, provided by media provider 102, to a user via a user interface associated with the media provider 102. For example, media provider 102 can be a media presentation source configured to present and distribute media content (e.g., streaming videos) to users over a network 116. Presentation component 104 can generate and/or employ a user interface that facilitates organizing and presenting media content provided by media provider 102. The presentation component 202 can generate this interface and present the media items in various forms and arrangements.

Figure 1B:
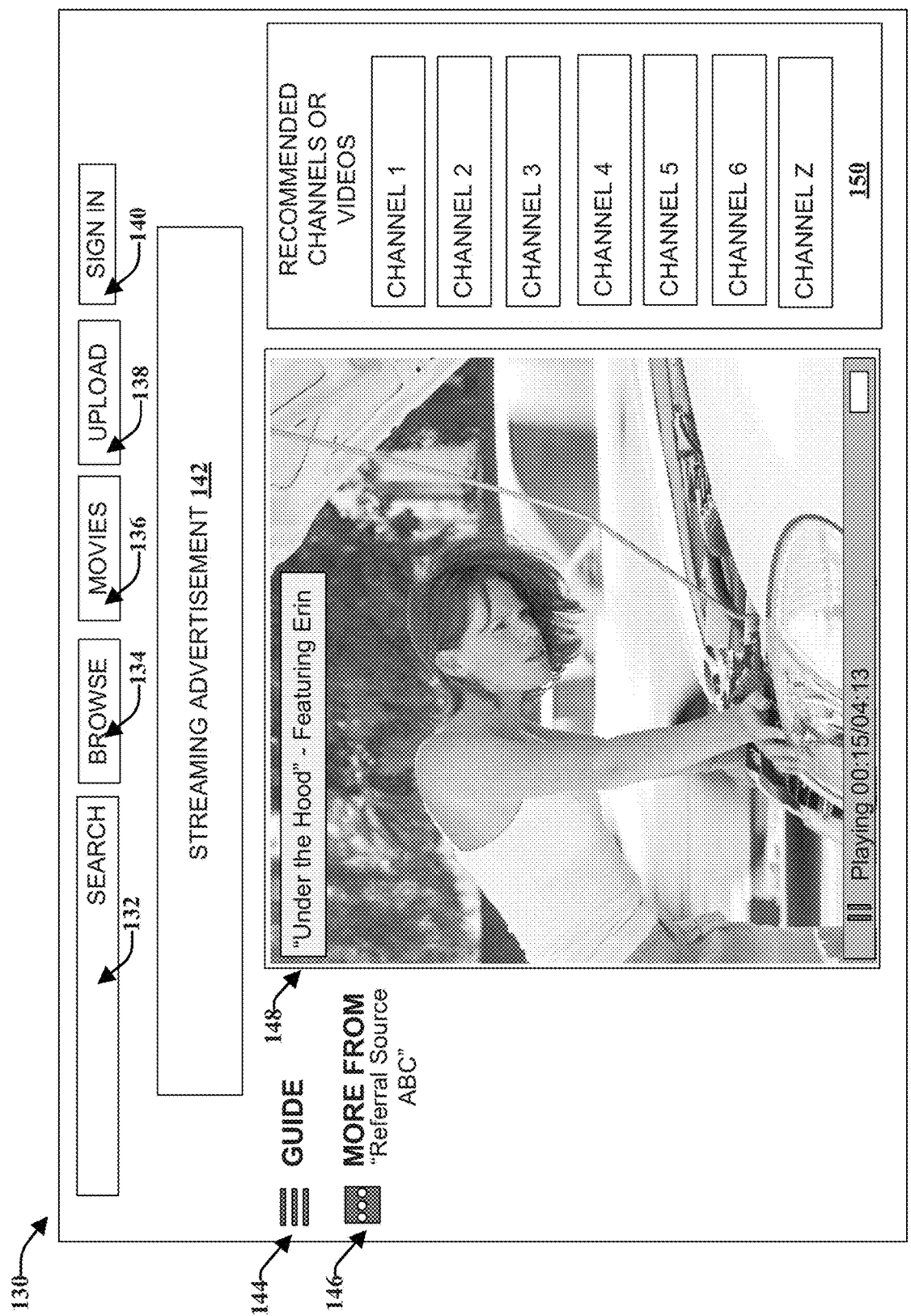
FIGS. 1B-1D present example user interfaces generated/employed by recommendation systems described herein to present and organize media items in accordance with various aspects and embodiments.
Figure 1C:
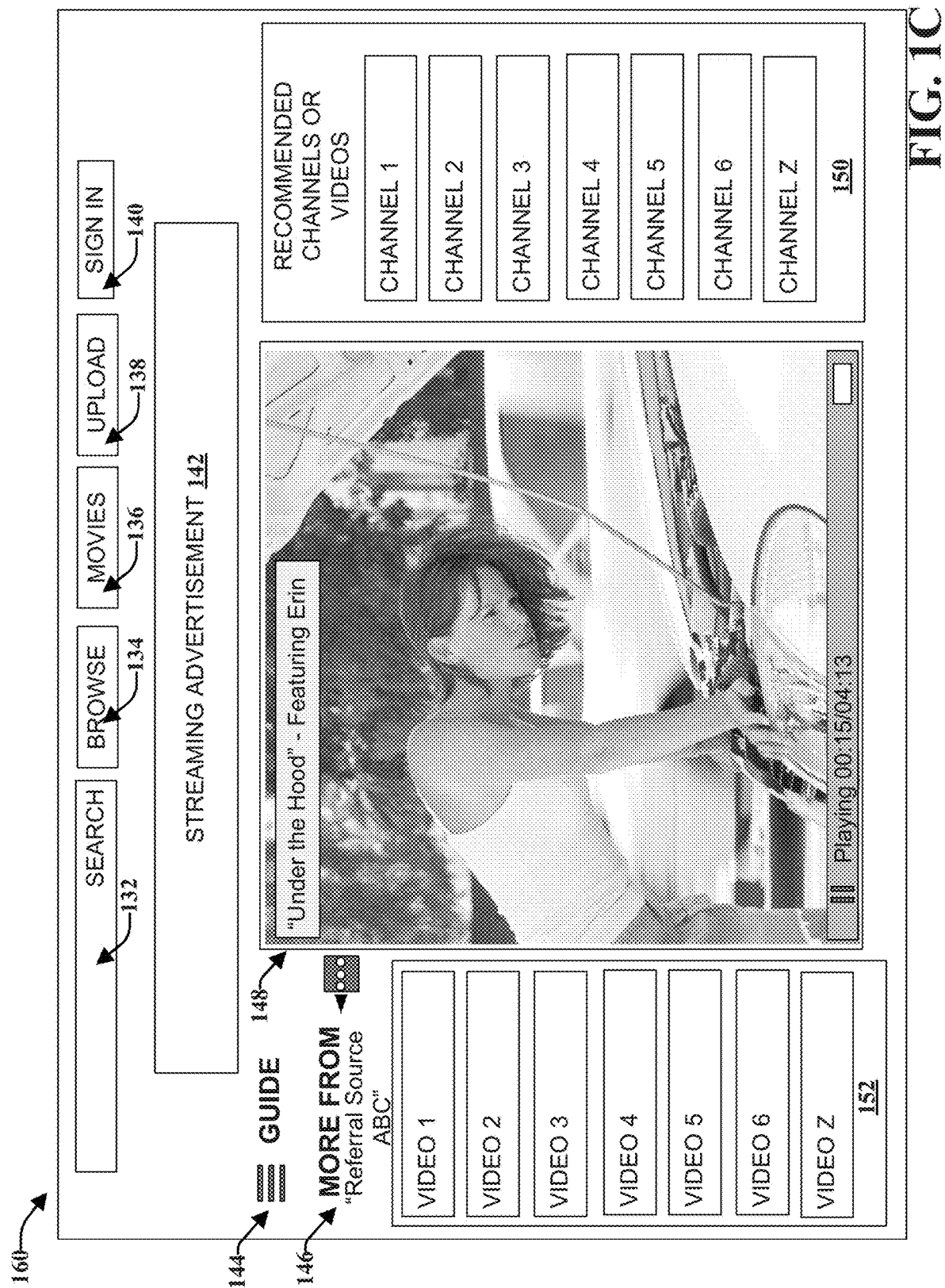
Figure 1D:
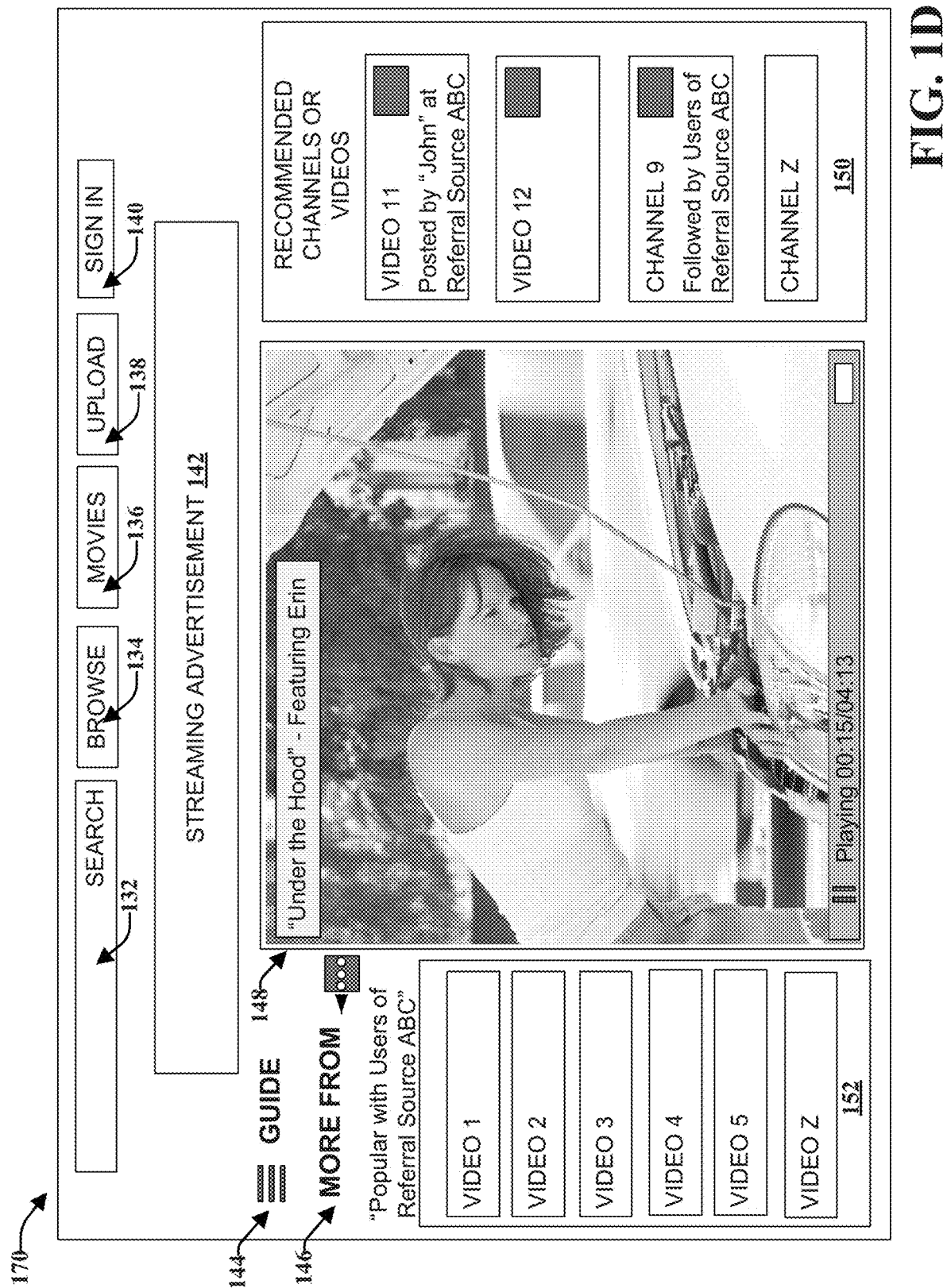

FIGS. 1B-1D present example user interfaces generated/employed by presentation component 104 to present and organize media items in accordance with various aspects and embodiments described herein. With reference to FIG. 1B, an example user interface 130 can include various sections such as a primary display section 148 in which a selected video is played/presented in a video player, a subsection having views of recommended channels or videos considered relevant to a user 150, a channel guide 144 that can be expanded to display various categories of channels, a "More From" section 146 that can be expanded or minimized to display videos and/or channels associated with a referral source, and a section with a streaming advertisement 142. The interface 130 can also include various menu options presented in an upper panel of the interface including a search box 132, a browse box 134, a movies box 136, an upload box 138 and sign in box 140. In some aspects videos and/or channels presented to a user in the "More From" section 146 and/or recommended channels or videos section 148 can be displayed as thumbnails or in a list view. A thumbnail can include a static image of a media item that represents the media item and allows the user to select and/or preview the media item. In an aspect, a user can select a video for viewing by selecting a thumbnail view of a video and the video can be presented to the user in the primary display section 148 or a larger window of a new interface display page (as compared to the size of the thumbnail view).

In an aspect, presentation component 104 is configured to present a media item to a user in the primary display section 148 using a media player associated with the user interface in response to selection of a link or hyperlink for the media item where the link or hyperlink for the media item is located at a referral source. For example, with reference to FIG. 1B, when a user follows a link located at a referral source ABC representing a video entitled "Under the Hood" provided by media provider 102, the presentation component 104 can display the video to the user in a user in a primary display section 148 of an interface 130 associated with the media provider 102. In an aspect, presentation component 104 can begin automatically playing the video. In another aspect, the presentation component 104 can present the user with a static thumbnail view of the video which the user can then select to initiate playing of the video.

Thus, in an aspect, when a user follows a link or hyperlink from a referral source for a video provided by media provider 102, presentation component 104 can facilitate presenting the video to the user at an interface (e.g., a website) employed by the media provider 102. The presentation component 104 can further be configured to present various features of media provider 102 via the user interface such as various media items recommended to the user, search tools for finding media items, menu options that facilitate navigating content provided by media provider, etc.

Referring back to FIG. 1A, analytics component 106 is configured to identify one or more media items provided by media provider 102 having a relationship with a referral source at which a link to a media item provided by the media provider 102 was located and followed by a user. In particular, when a user follows a link for a media item from a referral source 114 and the media item is provided by media provider 102, the analytics component 106 identifies the media item as a media item referred to the user from the referral source 114. The analytics component 106 can then identify one or more other media items provided by media provider 102 having a relationship with the referral source 114.

The analytics component 106 can identify a relationship between a media item provided by media provider 102 and a referral source 114 based on various features associated with the referral source 114 itself as well as users of referral source 114. In an aspect, analytics component 106 can consider a media item provided by media provider 102 as having a relationship with a referral source 114 if the media item has a link or hyperlink at the referral source 114. For example, analytics component 104 can identify all videos provided my media provider 102 having links at referral source ABC. In another aspect, the analytics component 106 can identify other referral sources related to referral source ABC and identify media items provided by media provider 102 that have links posted at the other referral sources. For example, where referral source ABC is an educational program website related to advanced biology, the analytics component 106 can identify other referral sources related to advanced biology and identify media items provided by media provider 102 having links at the other related referral sources.

In another aspect, the analytics component 106 can consider a media item provided by media provider 102 as having a relationship with a referral source 114 if a user of the referral source 114 interacted with the media item (e.g., viewed, watched, liked, commented on, shared, saved, subscribed to, etc.) in some manner at the media provider 102 (e.g., using an interface associated with media provider 102). For example, analytics component 106 can identify all videos provided by media provider 102 that users of referral source ABC watched and/or marked or indicated as liked. In yet another aspect, analytics component 106 can consider a media item provided by media provider 102 as having a relationship with a referral source 114 if the media item includes content related to content associated with the referral source 114. For example, where the referral source 114 is an educational program website related to advanced biology, the analytics component 106 can identify other videos provided by media provider 102 related to advanced biology.

The analytics component 106 can further apply various filters to organize, filter, and refine lists of media items provided by media provider identified as having some type of relationship with a referral source 114 that referred a user to a media item provided by media provider 102 (e.g., via a hyperlink located at the referral source). For example, the analytics component 106 can generate a first list all media items provided by media provider 102 that have links at a particular referral source 114 from which a media item of media provider 102 was referred to a user. The analytics component 106 can further filter the first list based on those media items included in the first list that were actually selected and followed by other users of the referral source. In another aspect, the analytics component 106 can generate a first list of media items that were watched by other users associated with a referral source 114 from which a media item of media provider 102 was referred to a user. The analytics component 102 can further filter the first list of media items as a function of a known association between the user and a subset of the other users. For example, the analytics component 106 can identify all videos in the first list that were watched by users selected as or considered friends with the user. This filtered list can be associated with a titles such as "Other Videos Your Friends whom Also Use Referral Source [insert name of referral source] Watched."

In another aspect, the analytics component 106 can filter media items based on information associated with a link for a media item at a referral source that a user clicked on which brought the user to media provider 102 to view the media item. In particular, links or hyperlinks can include rich data or metadata (e.g., attribution tags) that indicates various attributes associated with the link that can be employed by analytics component 106 to filter and organize media items in a manner that tailors the media items to the user. For example, links or hyperlinks can include information associated with the media item represented by the link, the client device 118 that formatted and created the link, location of the client device 118 that formatted and created the link, time of creation of the link, and information about the user who created the link.

For example, the analytics component 106 can examine a hyperlink representative of a media item provided by media provider 102 that a user followed from a referral source and identify a location associated with the user device employed to generate the link. According to this example, the hyperlink can include location information which the analytics component 106 can examine to identify the location. For instance, the location information can include an internet protocol (IP) address associated with the client device at the time of generation of the hyperlink at the referral source. The analytics component 106 can then filter a list of media items identified as having a relationship with the referral source 114 based on the location. For example, where a user selects a link to a video at a referral source 114 that was created by a client device 118 in France, the analytics component 106 can identify videos provided by media provider having a relationship to the referral source 114 that are from (e.g., uploaded to media provider by users in France) or otherwise associated with France (e.g., watched by users located in France, having audio in French, etc.).

In another example, the analytics component 106 can examine a hyperlink representative of a media item provided by media provider 102 that a first user followed from a referral source 114 and identify a second user that posted the hyperlink at the referral source 114. The analytics component 106 can then identify other videos provided by media provider 102 that the second user posted links to at the referral source 114 or other videos the second user posted links to at other referral sources. In yet another example, the analytics component 106 can examine a hyperlink representative of a first media item provided by media provider 102 that a user followed from a referral source 114 and identify a time when the link was posted at the referral source 114. The analytics component 106 can then identify other videos provided by media provider 102 that have links posted at the referral source 114 within a predetermined time frame associated with the time which the link to the first media item was posted.

In an aspect, the analytics component 106 can employ a ranking component (discussed supra with respect to FIG. 2) to facilitate filtering and organizing media items identified based on a relationship of the media items with a referral source 114. For example, the ranking component can apply various indicators of user interest in media items identified by the analytics component 106 to rank the media items as a function of estimated user interest level in the respective media items. The analytics component 106 can then filter a set of media items based on ranking information respectively associated with media items in the set.

The recommendation component 108 is configured to recommend one or more media items identified by the analytics component 106 to a user through a user interface (e.g., interfaces 130, 160 and 170 respectively presented in FIGS. 1B, 1C and 1D) generated by presentation component 104. In an aspect, the recommendation component 108 can recommend all media items identified by analytics component 106. Depending on the various filters applied by the analytics component 106, the referral source 114, and the media item that was referred by the referral source, this list of recommended media items can vary greatly in size. In some aspects to narrow down the list of recommended media items to those considered most interesting or relevant to a user, the recommendation component 108 can recommend media items to the user as a function of ranking (discussed supra with respect to FIG. 2).

In an aspect, the presentation component 104 is configured to present media items collected or identified by recommendation component 108 in one or more recommended videos sections of a user interface associated with media provider 102. For example, the recommendation component 108 can recommend one or more videos identified by analytics component 106 as videos the user may have an interest in watching. According to this example, the presentation component 104 can present these one or more recommended videos to a user in a recommendation section of a user interface as thumbnails or in a list view.

In an aspect, a recommendation section can be tailored to present only videos recommended based at least in part on a relationship with a referral source 114 from which a media item provided by media provider 102 was recommended to a user. According to this aspect, the presentation component 104 or recommendation component 108 can associate a title with a recommend video section that describes the basis for which the videos were recommended. For example, the recommendation section can be titled "More Videos From [insert name of referral source]," and include videos that have links at the referral source. In another example, the recommendation section can be titled "More Videos Users of [insert name of referral source] Watched," and include videos provided by media provider that users of the referral source watched. In another example, the recommendation section can be titled "More Videos Users of [insert name of referral source] Followed," and include videos provided by media provider having links at the referral source that users of the referral source clicked on or selected.

In an another aspect, the recommended videos can be included in a recommendation section or other section that includes videos recommended or presented to the user for various reasons that are not based on a relationship with a referral source. According to this aspect, a video which is recommended to the user based at least in part on a relationship with a referral source can be identified by the presentation component 104 with the addition of a tag, overlay or other insignia to the thumbnail view of the video that indicates the basis for which the video was recommended. For example, the videos recommended based on click through from a referral source can be associated with text that states "Followed from [insert name of referral source here]."

For example, FIGS. 1B-1D depict example user interfaces with sections entitled "More From" and "Recommended Channels or Videos." The "More From" section 146 can be configured to include videos recommended to a user by recommendation component 108 based at least in part on an association with a referral source. The "Recommended Channels or Videos" section 150 can be configured to include videos recommended to a user for various reasons not limited to or restricted by a relatedness to a referral source. For example, as seen in FIGS. 1B and 1C, the "More From" section 146 can include more videos from referral source ABC in response to selection of a link to a video (the video entitled "Under the Hood" being presented to the user in the primary display area 148) at referral source ABC that is provided by media provider 102. In another example, the "More From" section include media items recommended to a user that are considered popular with users of referral source ABC, as seen in interface 170 of FIG. 1D.

In an aspect, the presentation component 104 can present the "More From" section in a minimized view, as seen in interface 130 of FIG. 1B. A user can further select to expand the "More From" section to view the recommended media items in a list view or thumbnail view 152 as depicted in interface 160 of FIG. 1C.

FIG. 1D, further exemplifies an interface 170 in which recommended videos are included in the "Recommended Channels or Videos" section 150 for various reasons and where videos or channels that are recommended based on a relationship with a referral source are identified. For example, Video 11 is identified with a label indicating that the video was posted by user "John" at referral source ABC. According to this aspect, video 11 can be recommended based in part on the fact that the referral video "Under the Hood" was also posted by John at referral source ABC. Video 12 can be recommended for another reason having no basis with respect to an association with referral source ABC, while channel 9 is recommended and identified as being followed by users of referral source ABC.

Referring back to FIG. 1A, presentation component 104 can present content viewing options for use with any suitable type of device configured to interface with a streaming media provider, for example mobile phone, tablet computer, desktop computer, server system, personal computers, cable set top box, satellite set top box, cable modem, television set, internet-enabled televisions, television computer device media extender device, video cassette recorder device, blu-ray device, DVD (digital versatile disc or digital video disc) device, compact disc device, video game system, audio/video receiver, radio device, portable music player, navigation system, car stereo, etc.

The respective devices listed above (and additional devices suitable for interfacing with a streaming media provider) often have different capabilities and limitations (e.g., screen size, decoders . . . ). In an aspect, presentation component 104 can provide presentation options in accordance with different device capabilities or limitations. For example, data rendering capabilities may be more limited in a mobile device (e.g., a smart-phone) than in a fixed computing device (e.g., a desktop computer), more effort may be required of a user to consume content such as a video (or other information) from the mobile device than would be required of the user in viewing the same video from a fixed computing device. In addition, because displays of various mobile devices are often smaller than displays in fixed computing devices, it may be possible only to display a relatively small amount of information at any given time on a mobile device. Finally, data connections between a mobile device and various networked resources (e.g., the Internet) may be slower than corresponding data connections between a fixed computing device and the same networked resources. Accordingly, presentation component 104 can generate user options to account for variations in device functionality and available bandwidth for consumption and rendering of media content.

In view of the above, presentation component 104 can present content in various formats and/or in accordance with various display mediums. In particular, the presentation component 104 can adapt and optimize display of options and content based on respective client devices. For example, presentation component 104 can adapt the manner in which a video recommended for re-watch is presented to a user (e.g., as an end-cap, as a pop up, in a recommendation section, etc.) based on client device 118 capabilities and display restrictions. In another example, presentation component 202 can present a section of video in a format such as H.263, H.264 AVC, MPEG-4 SP, VP8, or other suitable format based on the client device 118. In yet another example, presentation component 104 can present an audio of a video in formats such as for example AAC LC/LTP, HE-AACv1 (AAC+), HE-AACv2 (enhanced AAC+), AMR-NB, AMR-WB, FLAC, MP3, MIDI, Vorbis, PCM/WAVE, etc.

In an aspect, presentation component 104 can automatically configure or present user options to consume video based on encoding parameters such as video resolution, video frame rate, video bit rate, video codec, audio codec, audio channels, audio bit rate, etc. Thus presentation component 104 can choose a format to consume content that best suits capabilities of specific consumption mediums, available bandwidth, file size, processing capabilities, screen resolution, screen size, available encoders, available decoders, etc.

Figure 2:
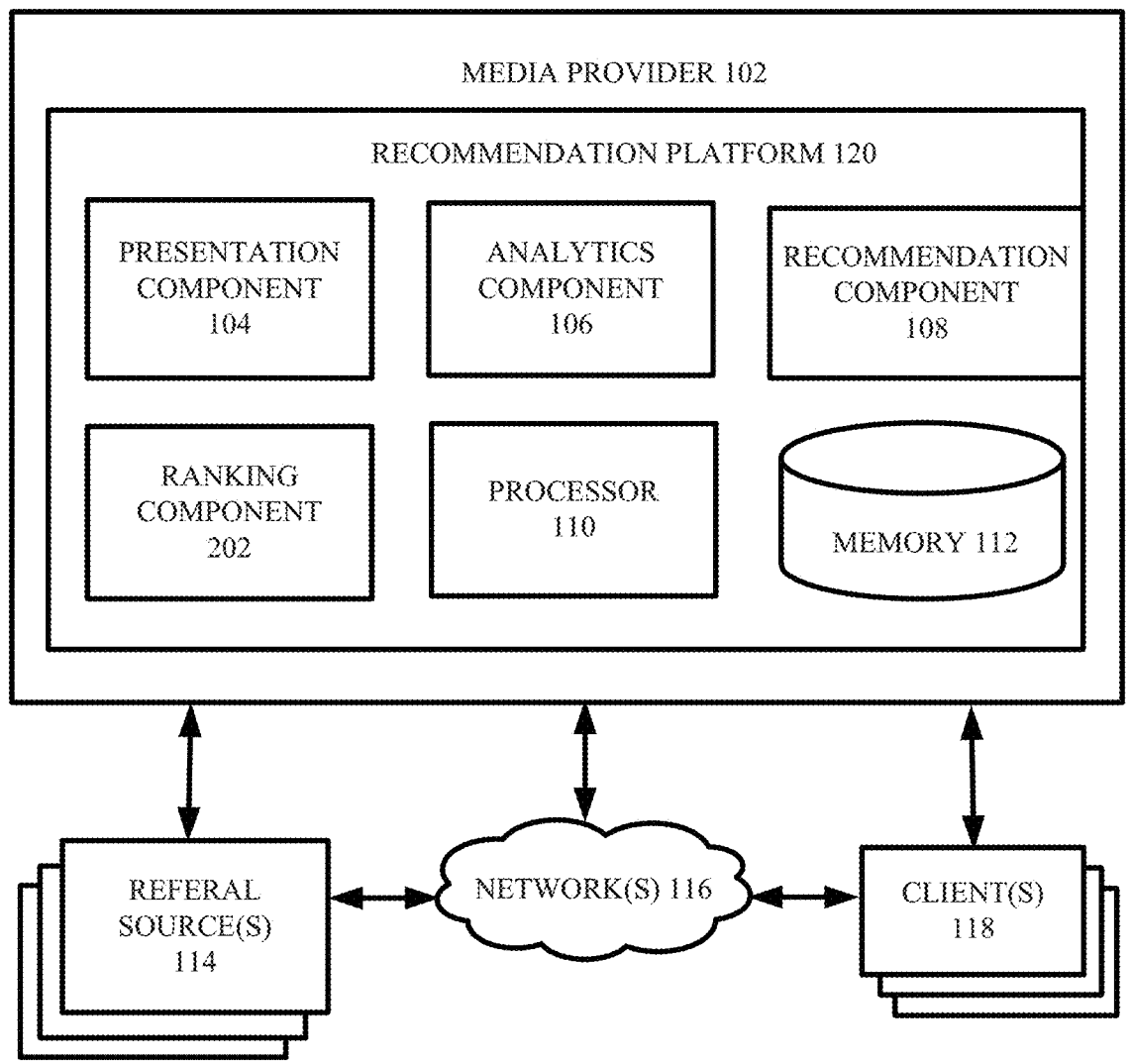
FIG. 2 illustrates another example system for recommending media content to a user based on information associated with a referral source that referred the user to a media item provided by a source of the media content, in accordance with various aspects and embodiments described herein.

Referring now to FIG. 2, presented is diagram of another example system 200 for recommending media content to a user based on information associated with a referral source that referred the user to a media item provided by a source of the media content, in accordance with various aspects and embodiments described herein. System 200 includes same features and functionalities of system 200 with the addition of ranking component 202. Repetitive description of like elements employed in respective embodiments of systems and interfaces described herein are omitted for sake of brevity.

Recommendation platform 120 can include a ranking component 202 to facilitate identifying media items by analytics component 106 for potential recommendation to users by recommendation component. The ranking component 202 is configured to apply ranking information to respective media items of a set of media items identified by analytics component 106. The set of media items identified by the analytics component 106 includes one or more media items identified as having a relationship with a referral source 106 that referred a user to a media item provided by media provider 102 in the various manners discussed supra. The respective ranking information associated with the media items can represent a determined or inferred probability that the user has interest in accessing (e.g., viewing, watching, listening to, reading, etc.) the respective media items.

In an aspect, the analytics component 106 can employ the ranking information associated with a media item to further filter a set of media items into a subset of media items that are tailored to the user. The recommendation component 108 can then recommend the subset of media items to the user. In another aspect, the ranking information associated with a media item can influence the manner in which the recommendation component 108 recommends the media item to the user and/or how the presentation component 104 presents the media item to the user. In another aspect, the ranking associated with a media item can influence how the media item appears in a search query result for a search query issued by the user. Still in yet another aspect (discussed supra with respect to FIG. 5), the ranking associated with a media item can influence association of advertisements with the media item, charging schemes for the advertisements, and data collection regarding user consumption/interaction with the advertisements.

For example, the ranking component 202 can apply respective rankings to a set of videos identified by analytics component 106 as videos related to a referral source 114 that referred a video provided by media provider 102 to a user (e.g., via a hyperlink located at the referral source 114 that was followed by the user). The rankings can represent probabilities that the user has interest in watching the respective videos. The ranking associated with a particular video can further influence identification of the video by analytics component 106 for inclusion in a subset (e.g., one or more videos) of videos for recommendation to the user by recommendation component 108. For example, the analytics component 106 can identify a subset of media items based on rankings of the media items in the subset being above a predetermined threshold. The basis for the rankings can vary as a function of user interest factors discussed below. Thus filtering or identification of media items by the analytics component 106 can be a function of the various user interest factors discussed below. For example, media items watched by other users having similar interests to the user for which media items are being recommended, (an example user interest factor), can receive higher rankings than other videos watched by users having dissimilar interests. Thus filtering or identification of media items by the analytics component 106 can be a function of ranking which is a function of the various user interest factors discussed below. Therefore a ranking associated with a particular video can influence whether the video is recommended to the user.

A ranking associated with a particular video can also influence how the video is recommended to a user (e.g., placement/order of the video in a list of recommended videos). For example, the recommendation component 108 can recommend a video having a higher ranking above a having a lower ranking. In another example, the recommendation component 108 can choose to recommend only videos that have a ranking above a predetermined threshold. In yet another example, where the ranking is above another predetermined threshold, the recommendation component 108 can place the video at the top of a recommendation list or an auto-play component (discussed supra with respect to FIG. 4) could initiate automatic playing of the video.

A ranking associated with a media item by ranking component 202 can also influence the order in which the video appears in a search query result for a search based on one or more factors associated with the video. A ranking associated with a media item can also influence advertisement association with the media item and/or charging for advertisements associated with the media item. It should be appreciated that manner in which a ranking associated with a media item, as assigned by the subject ranking component 202 affects filtering of media items by analytics component 106, recommendation of media items by recommendation component 108, presentation of recommended media items by presentation component 104, ordering of recommended media items, search query inclusion and ordering of media items, auto-replay of media items, and/or advertising associated with media items can vary and is not limited to the above examples.

The ranking component 202 is configured to rank media items identified by analytics component 106 as a function of one or more user interest factors considered reflective of a user's interest the media item. These user interest factors can be grouped into three categories including factors that relate to popularity of a media item, factors that relate to relationships between users and factors that relate to content of a media item.

In an aspect, the ranking component 202 can consider factors that are reflective of popularity of media items and associate higher rankings with media items that are more popular than media items considered less popular amongst a group of users. For example, the analytics component 106 can identify a set of videos provided by media provider 102 that have links at a referral source 114 that referred a user to a video provided by media provider 102. The ranking component 202 can then rank those videos in the set as a function of popularity of those videos amongst other users. According to this example, the ranking component 202 can consider videos included in the set that were collectively watched the most by the other users as most popular and rank those videos higher than videos that were watched the least. In addition, the ranking component 202 can consider factors reflective of popularity of a media item referred to and followed by a user when ranking other media items related to the referral source 114 for recommendation to the user. For example, where a user followed an unpopular video, the ranking component 202 can associate lower rankings to videos related to the referral source that were identified by analytics component 106.

Various factors/indicators can be considered reflective of popularity of a media item. In an aspect popularity of a media item is reflective of whether the media item is considered interesting to other users. For example, such indicators can include but are not limited to: number of users who viewed a media item, number of users who liked a media item, number of users who subscribed to a media item or channel associated with the media item, degree of interaction of users with a media item, number of users who created links to the media items a particular referral source, number of users that created links to the media item at multiple referral sources, number of existing links to the media item at collective referral sources, and number of users that selected a link for the media item at a referral source (e.g., followed the media item link at a referral source 114 to view the media item at an interface associated with media provider 102 that provides the media item). Other example of popularity of a media item can relate to recency of activity with the media item including but not limited to, recency of creation of a link or links to the media item at a referral source, and frequency of user interaction with a media item within a window of time considered recent (e.g., past 24 hours, past week, past month, etc.), including interaction at the media provider 102 and interaction at a referral source 114 (e.g., selection of a link to the media item).

The ranking component 202 can also consider factors reflective of relationships between users when ranking media items. For example, the ranking component 202 can associate higher rankings with media items watched or interacted with by users that share similarities to a first user who was referred to a media item by a referral source 114 than media items watched or interacted with by users who are dissimilar to the first user. The recommendation component 108 can then recommend videos having a higher ranking to first user. This feature follows the assumption that like users will generally have similar interests in media content.

For example, the analytics component 106 can identify a set of videos provided by media provider 102 that other users from a referral source 114 that referred a first user to a media item, provided by the media provider, watched, liked, enjoyed, etc. The ranking component 202 can then examine the other users respectively associated with the videos of the set based on various factors including but not limited to: user preferences, topics of interest to the users, user demographics, and social relationships between the other users and the first user (e.g., whether any of the other users are friends of the first user). The ranking component 202 can further examine information associated with the first user including but not limited to, first user preferences, topics of interest to the first user, and first user demographics. The ranking component 202 can then rank then rank the videos in the set based on similarities between the first user and other users respectively associated with the videos. The ranking component 202 can further rank media items identified by analytics component 106 a function of popularity of the media items within a cluster of users clustered based on similarities or social associations to the referred user.

The ranking component 202 can also consider factors reflective of the content associated with a referred media item and/or referral source 114 when ranking media items to reflect predicted user interest in the media items. For example, the analytics component 106 can identify a set of videos provided by media provider 102 that have links at a referral source 114, and/or are associated with users of the referral source, that referred a user to a video provided by media provider 102. The ranking component 202 can then identify content associated with the referred video and rank the videos in the set based on similarity in content to the referred video. For example, where the referred video is about horse jumping, the ranking component 202 can rank videos in the set related to horse jumping higher than videos related to horse grooming. In another aspect, the ranking component 202 can analyze the referral source to identify content associated with the referral source and rank the videos in the set based on similarity in content between the referral source and the videos in the set. For example, where the referral source is a home improvement information website, the ranking component 202 can rank videos in the set related to home improvement higher than videos that are not related to home improvement.

The ranking component 202 can employ various algorithms (stored in memory 112 or external memory accessible to ranking component 202) that apply one or more user interest factors, discussed above, considered reflective of a user's interest in media items, to rank media items having a relationship with a referral source 114. In an aspect, the analytics component 106 can generate a list or set of media items having a relationship with a referral source 114 based the various filters/parameter discussed above with respect to FIG. 1A, system 100. The ranking component 202 can then rank the media items included in the set based on the various user interest factors discussed above. For example, the analytics component 106 can generate a set of media items having links at a referral source that were selected/followed by users of the referral source. The ranking component 202 can then apply one or more algorithms that account for one or more of the user interest factors discussed below to rank the media items of the subset.

In another aspect, the ranking component 202 can apply one or more of the various filters discussed above with respect to the analytics component 106 in FIG. 1A, system 100 (e.g., click through, location information associated with the media item hyperlink, etc.), as well as one or more of the user interest factors discussed above, to rank media items identified by analytics component 106 as having a relationship with a referral source. For example, the analytics component 106 can identify all videos provided by media provider 102 that have links at referral source ABC. The ranking component 202 can then rank the media item as a function of one or more of the user interest factors discussed and one or more of the above and one or more of the filters discussed above with respect to the analytics component 106 in FIG. 1A, system 100 (e.g., click through, location information associated with the media item hyperlink, etc.). According to this aspect, any of the filters discussed above with respect to analytics component 106 in FIG. 1A can be considered user interest factors.

Figure 3:
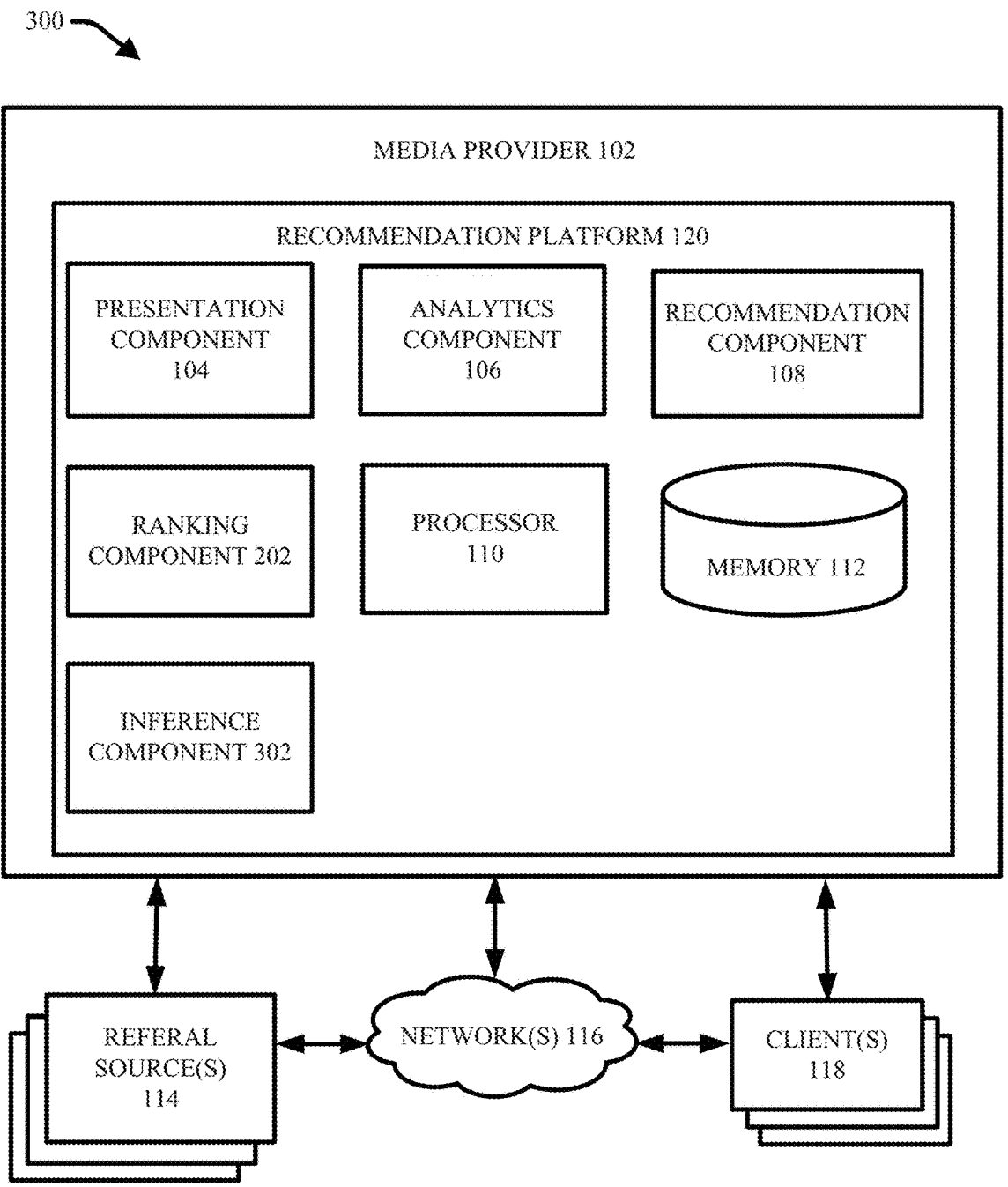
FIG. 3 illustrates another example system for recommending media content to a user based on information associated with a referral source that referred the user to a media item provided by a source of the media content, in accordance with various aspects and embodiments described herein.

FIG. 3 presents a diagram of another example system 300 for recommending media content to a user based on information associated with a referral source that referred the user to a media item provided by a source of the media content, in accordance with various aspects and embodiments described herein. System 300 includes same features and functionalities of system 200 with the addition of inference component 302. Repetitive description of like elements employed in respective embodiments of systems and interfaces described herein are omitted for sake of brevity.

Inference component 302 is configured to provide for or aid in various inferences or determinations associated with aspects presentation component 104, analytics component 106, recommendation component 108 and ranking component 202. In an aspect, all or portions of recommendation platform 120 can be operatively coupled to inference component 302. Moreover, inference component 302 may be granted access to all or portions of recommendation platform 102, media provider 102, external referral sources 114, and client devices 117.

In an aspect, the inference component 402 can facilitate inferring a ranking for a video by ranking component 202 (e.g., inferring a probability that the user has an interest in the video). For example, the inference component 402 can apply one or more of the above factors to media items, such as videos, identified by analytics component 106, to infer a degree/probability of user interest in the respective media items. The inference component 302 can further infer whether and how to recommend and present media items based on ranking information associated therewith. For example, the inference component 302 can infer whether to recommend a video to a user based on the ranking associated therewith. In another example, the inference component 302 can infer how to order a video recommended to a user amongst other videos recommended to the user in a recommendation section of a user interface based in part on a ranking associated therewith.

In order to provide for or aid in the numerous inferences described herein, inference component 302 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, such as by $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 4:
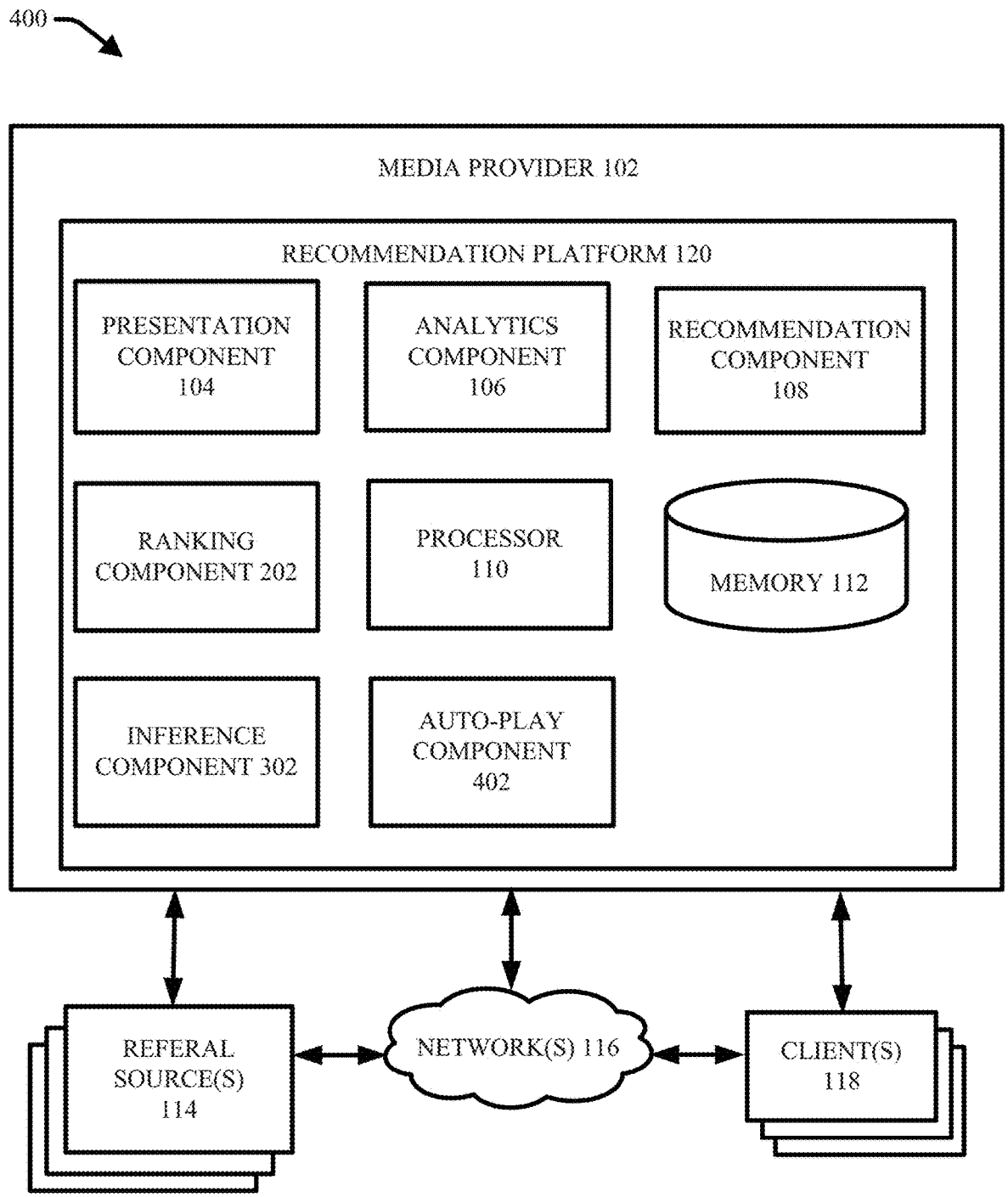
FIG. 4 illustrates another example system for recommending media content to a user based on information associated with a referral source that referred the user to a media item provided by a source of the media content, in accordance with various aspects and embodiments described herein.

FIG. 4 presents a diagram of another example system 400 for recommending media content to a user based on information associated with a referral source that referred the user to a media item provided by a source of the media content, in accordance with various aspects and embodiments described herein. System 400 includes same features and functionalities of system 300 with the addition of auto-play component 402. Repetitive description of like elements employed in respective embodiments of systems and interfaces described herein are omitted for sake of brevity.

Auto-play component 402 is configured to automatically replay a media item, such as a video or audio track, in response recommendation of the media item by recommendation component. For example, in response to identification by the analytics component 106 and/or recommendation component 108 of a video that a user may have an interest in based at least in part on a relationship between the video a referral source 114, the auto-play component 402 can automatically play the video in a media player of a user interface at a client device 118 employed by the user. In an aspect, the auto-play component 402 can be configured to automatically play a media item in response to a determination/inference by ranking component 202 and/or inference component 302 that the media item has a high probability of interest to the user. According to this aspect, the auto-play component 402 can be configured to automatically reply a video or audio track in response to association of a ranking with the video or audio track that is above a predetermined threshold. For example, the auto-play component 402 can be configured to automatically replay videos that have a 90% relevance level to the user (e.g., based on the various factors discussed herein).

In an aspect, the auto-play component 402 is configured to initiate the automatic replay of a video or audio track as a function of user context or user preferences. According to this aspect, the inference component 302 can infer a user context and/or user preferences. In other aspects, user preferences can be provided to recommendation platform 120 by user. User context can relate information including but not limited to, a users' physical location, a users' physical surroundings, a users' current activities, and time of day. For example, where the recommendation component 108 identifies a sports match video as having a high probability of relevance for a particular user, the auto-play component 402 can choose to automatically replay the video when the user is travelling to attend a similar sports match as opposed to a time when the user is attending church.

Figure 5:
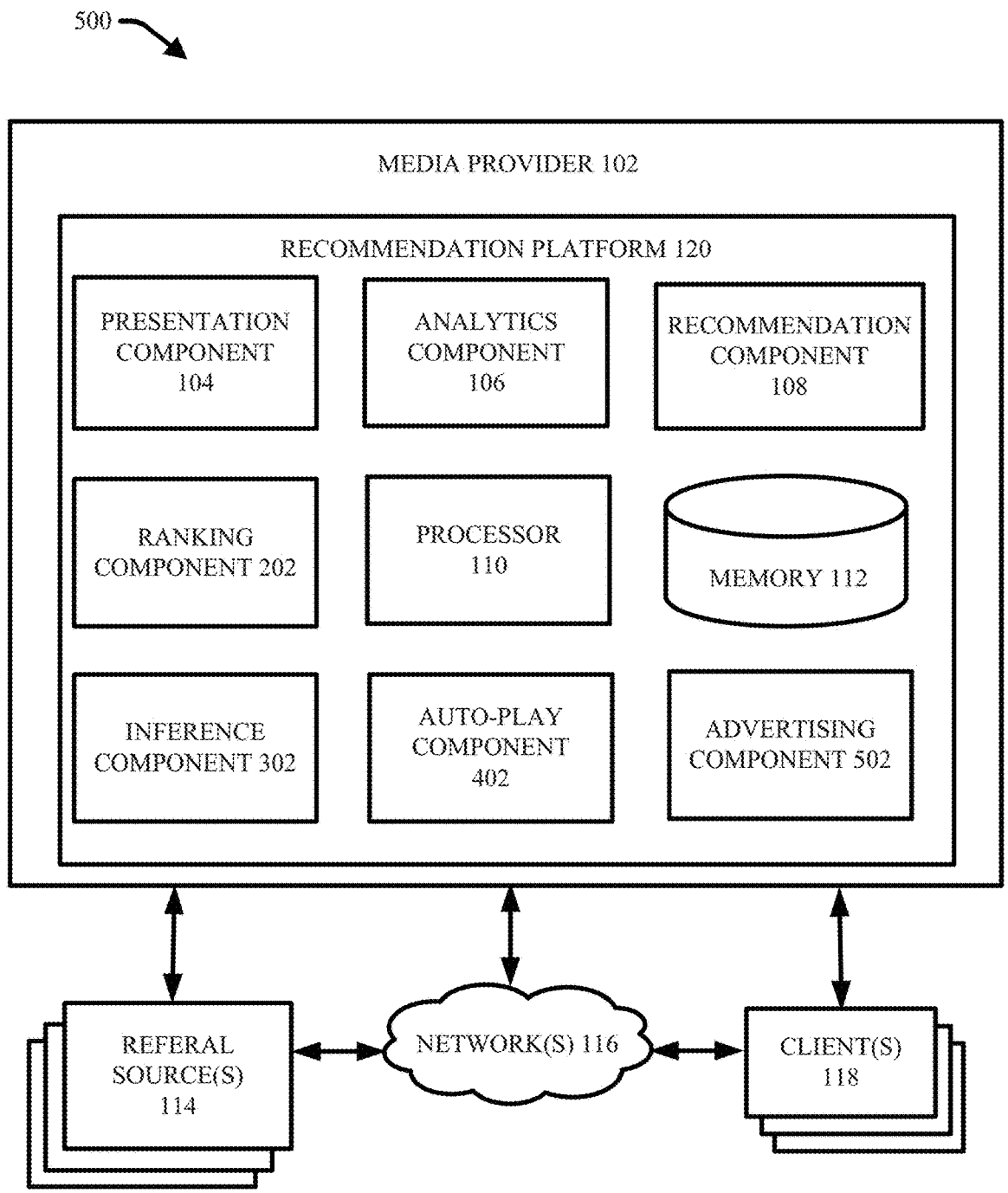
FIG. 5 illustrates another example system for recommending media content to a user based on information associated with a referral source that referred the user to a media item provided by a source of the media content, in accordance with various aspects and embodiments described herein.

FIG. 5 presents a diagram of another example system 500 for recommending media content to a user based on information associated with a referral source that referred the user to a media item provided by a source of the media content, in accordance with various aspects and embodiments described herein. System 500 includes same features and functionalities of system 400 with the addition of advertising component 502. Repetitive description of like elements employed in respective embodiments of systems and interfaces described herein are omitted for sake of brevity.

Advertising component 502 is configured to provide advertisements to users. These advertisements can include video ads, text ads, picture ads, audio ads, etc. In some aspects, the advertisements are associated with media content recommended to a user. In other aspects, a media item recommended to a user is an advertisement.

In an aspect, advertisement component 602 can identify advertisements best suited for association with a media item recommended to a user based on a relationship of the media item with a referral source. For example, the analytics component 106 can identify a second media item associated with a media provider 102 based in part on a relationship between the second media item and a referral source 114 that referred a first media item, provided by the media provider 102, to a user. The recommendation component 108 can further recommend the media item to the user. In an aspect, the advertisement component 602 can analyze the relationship between the second media item and the referral source 114 and infer (e.g., using inference component 302) an advertisement to associated with the second media item based on the referral source.

For example, the advertisement component 602 can identify the referral source and infer advertisements that related to content associated with the referral source. In another example, the advertisement component 602 can examiner users of the referral source and identify advertisements that art targeted to the users of the referral source (e.g., based on user interests, user demographics, user location, etc.).

In another aspect, the advertising component 602 can prioritize advertisement placement with media items recommended to a user based in part on association of the media items with referral sources. According to this aspect, recommendation platform 120 can receive and/or identify information regarding referral sources where links to media items provided by media provider are located, the number of links distributed at various referral sources for the respective media items, the number of click-through associated with respective links for the respective media items, and the number of user who posted the links. The advertisement component 602 can associate advertisement with media items based on one or more of these factors. By associating advertisements with media items based on one or more of the above listed factors, the advertisements will not only have a high probability of reaching users of media provider 102, but users of various referral sources in connection with usage of the various referral sources by the users. Accordingly, in an aspect, the advertisement component 602 can select high quality advertisements to associate with media items based on one or more of the above noted factors. The Advertisement component 602 can also require premium payment for advertisements associated with media items based on one or more of the above noted factors.

In another aspect, the advertising component 602 can prioritize advertisement placement with media items recommended to a user based in part on an inferred/determined user interest level in the media item reflected by a ranking associated with the media item. For example, when ranking component 202 associates a ranking with a media item that reflects a high probability the user will view the media item, the advertising component 602 can choose to place high quality advertisements with the recommended media item. Similarly, the advertising component 602 can choose to associate advertisements that have been purchased at a higher premium in exchange for premium placement with highly ranked media items.

In view of the example systems and/or devices described herein, example methods that can be implemented in accordance with the disclosed subject matter can be further appreciated with reference to flowcharts in FIGS. 6-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 6:
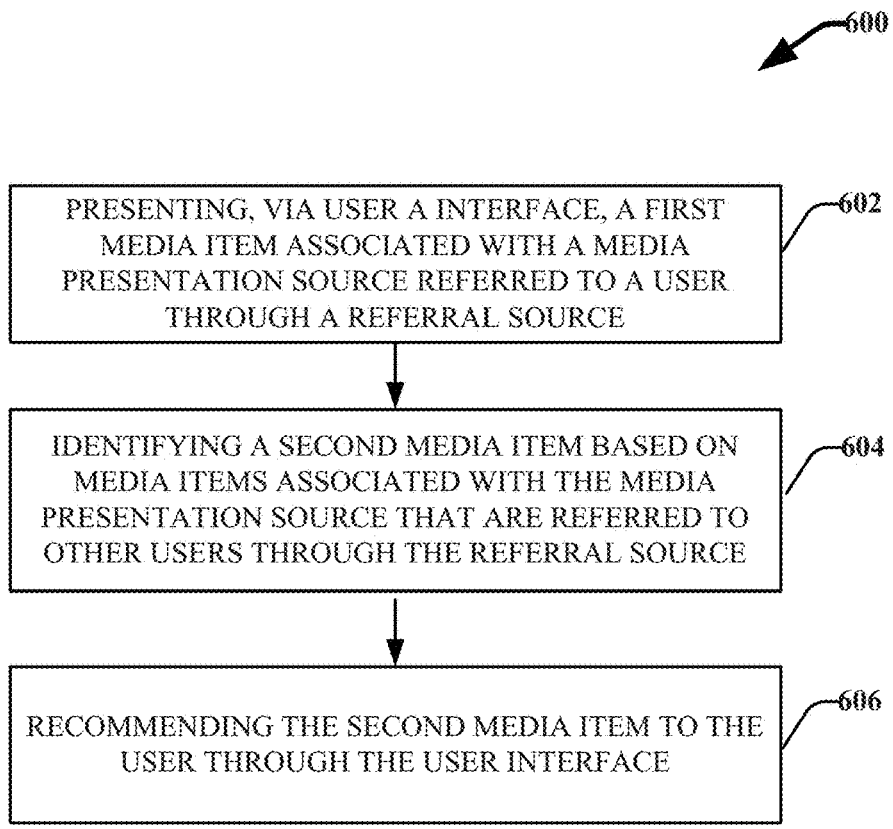
FIG. 6 is a flow diagram of an example method for recommending media content to a user based on information associated with a referral source that referred the user to a media item provided by a source of the media content, in accordance with various aspects and embodiments described herein.

FIG. 6 illustrates a flow chart of an example method 600 for recommending media content to a user based on information associated with a referral source that referred the user to a media item provided by a source of the media content, in accordance with aspects described herein. At 602, a first media item associated with a media presentation source referred to a user through a referral source is presented to the user via a user interface (e.g., using presentation component 104). At 604, a second media item is identified based on media items associated with the media presentation source that are referred to other users through the referral source (e.g., using analytics component 106). At 606, the second media item is recommended to the user through the user interface (e.g. using recommendation component 108).

Figure 7:
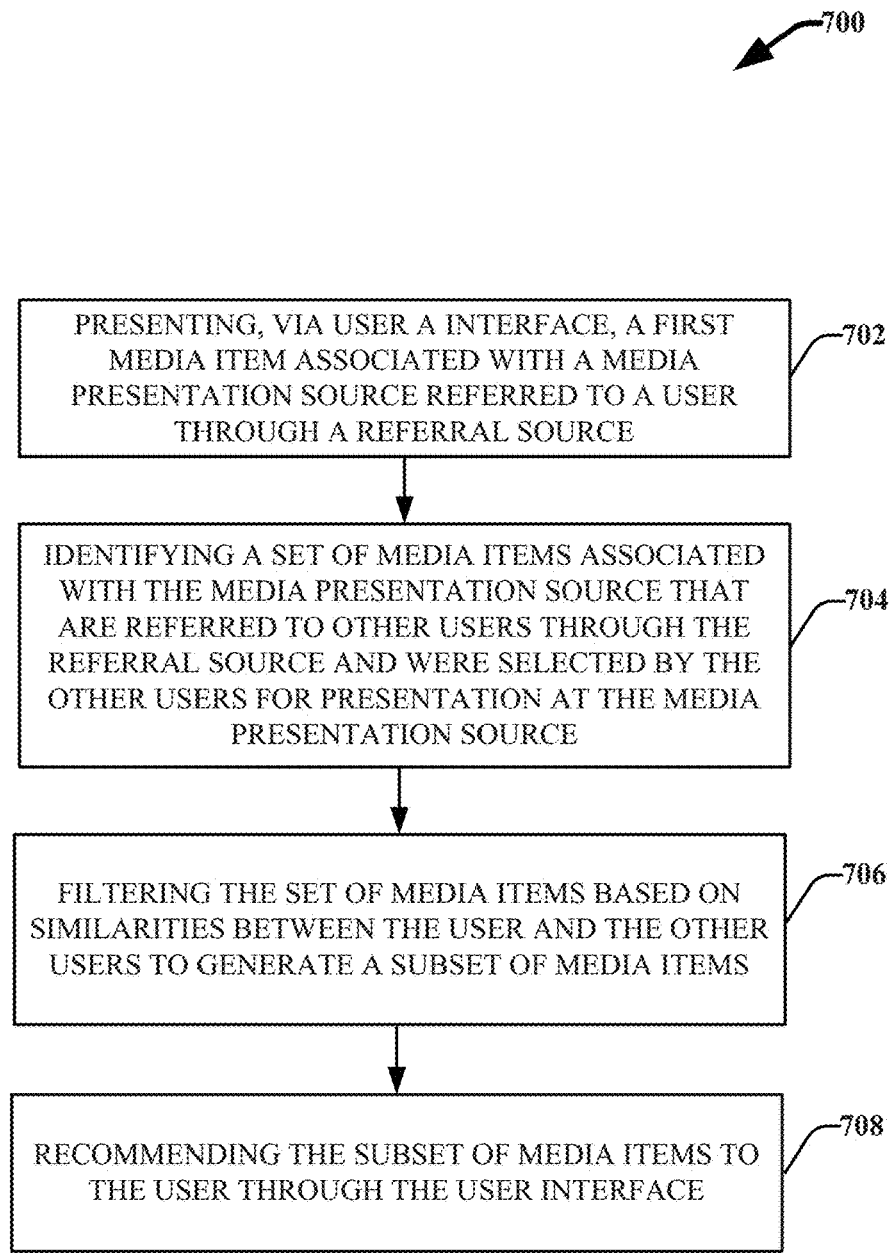
FIG. 7 is a flow diagram of another example method for recommending media content to a user based on information associated with a referral source that referred the user to a media item provided by a source of the media content, in accordance with various aspects and embodiments described herein.

FIG. 7 illustrates a flow chart of another example method 700 for recommending media content to a user based on information associated with a referral source that referred the user to a media item provided by a source of the media content, in accordance with aspects described herein. At 702, a first media item associated with a media presentation source referred to a user through a referral source is presented to the user via a user interface (e.g., using presentation component 104). At 704, a set of media items associated with the media presentation source that are referred to other users through the referral source and were selected by the other users for presentation at the media presentation source tare identified (e.g., using analytics component 106). At 706, the set of media items are filtered based on similarities between the user and the other users to generate a subset of media items (e.g., using analytics component 106). At 708, the second media item is recommended to the user through the user interface (e.g. using recommendation component 108).

Figure 8:
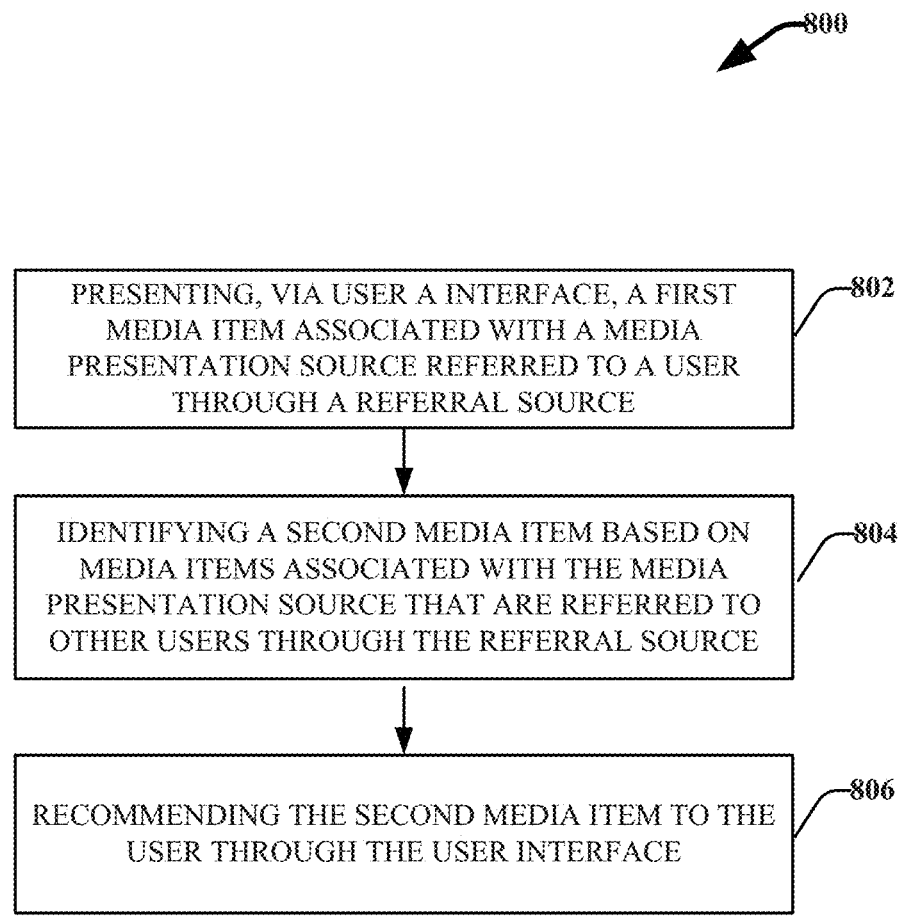
FIG. 8 is a flow diagram of another example method for recommending media content to a user based on information associated with a referral source that referred the user to a media item provided by a source of the media content, in accordance with various aspects and embodiments described herein.

FIG. 8 illustrates a flow chart of another example method 800 for recommending media content to a user based on information associated with a referral source that referred the user to a media item provided by a source of the media content, in accordance with aspects described herein. At 802, a first media item associated with a media presentation source referred to a user through a referral source is presented to the user via a user interface (e.g., using presentation component 104). At 804, a set of media items is identified based on information regarding other users associated with the referral source (e.g., using analytics component 106). At 806, the set of media items are recommended to the user through the user interface (e.g., using recommendation component 108).

Figure 9:
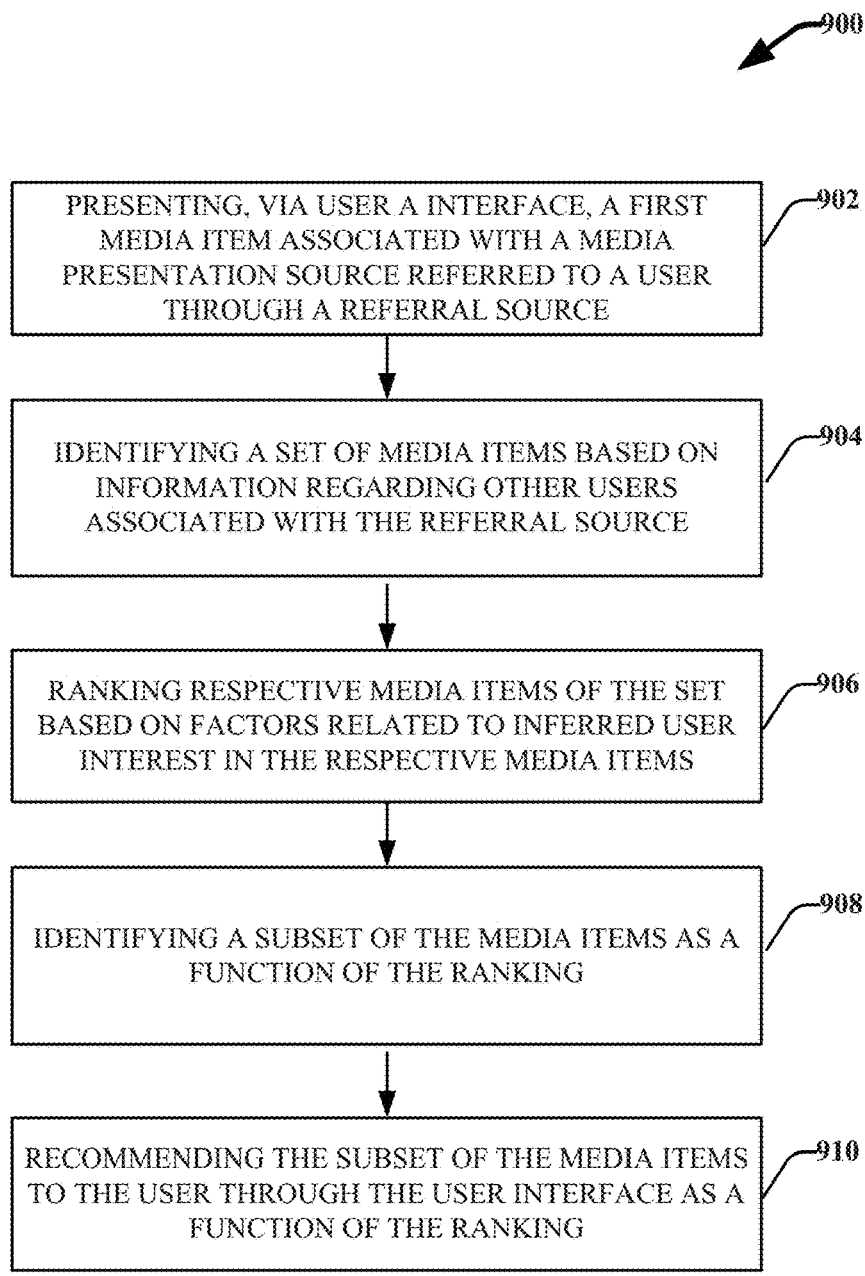
FIG. 9 is a flow diagram of another example method for recommending media content to a user based on information associated with a referral source that referred the user to a media item provided by a source of the media content, in accordance with various aspects and embodiments described herein.

FIG. 9 illustrates a flow chart of another example method 900 for recommending media content to a user based on information associated with a referral source that referred the user to a media item provided by a source of the media content, in accordance with aspects described herein. At 902, a first media item associated with a media presentation source referred to a user through a referral source is presented to the user via a user interface (e.g., using presentation component 104). At 904, a set of media items is identified based on information regarding other users associated with the referral source (e.g., using analytics component 106). At 906, the respective media items of the set are ranked based on factors related to inferred user interest in the respective media items (e.g., using ranking component 202). At 908, a subset of the media identified as a function of the ranking (e.g., using analytics component 106). At 910, the subset of the media items are recommended to the user through the user interface as a function of the ranking (e.g., using recommendation component 108).

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 10:
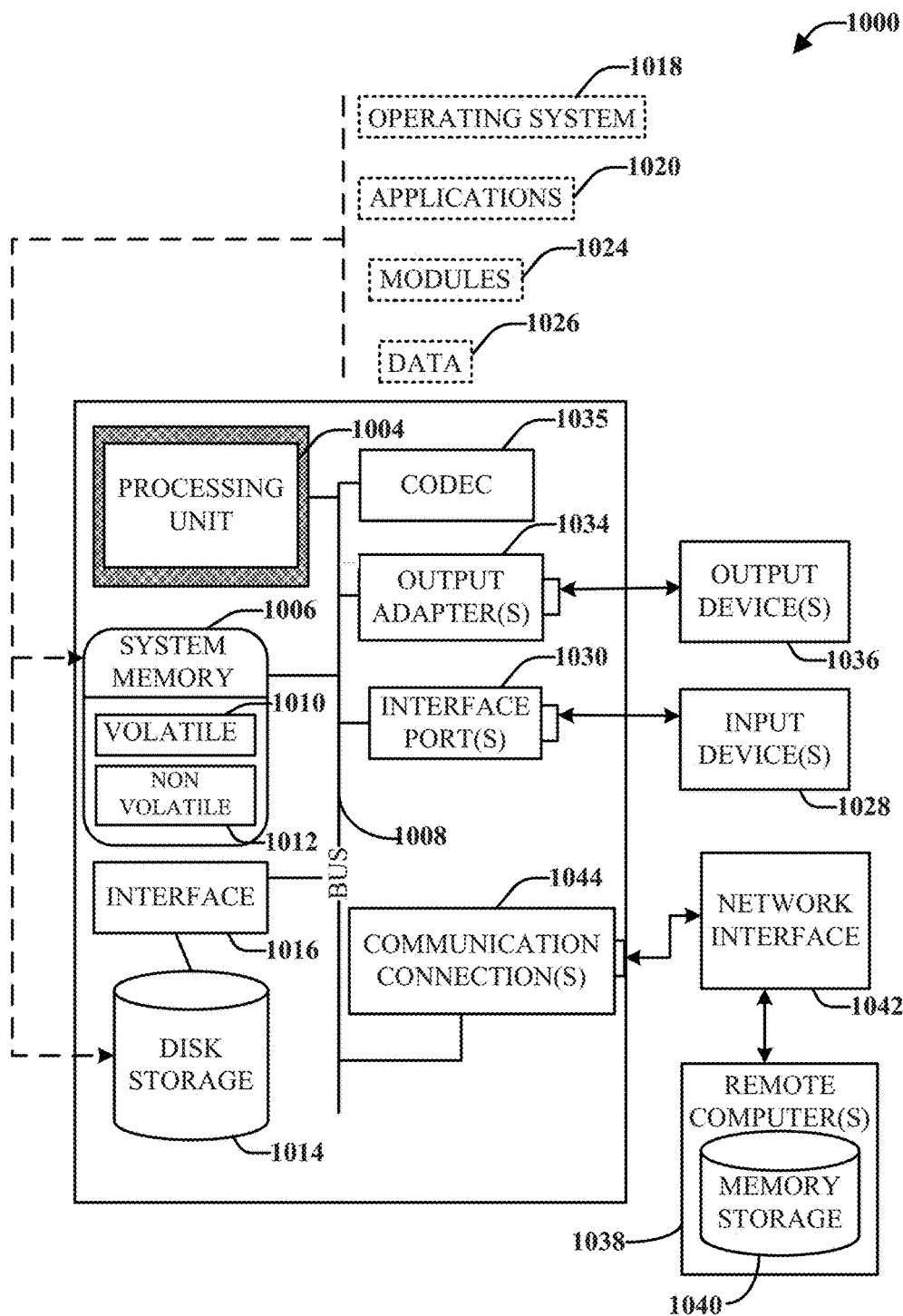
FIG. 10 is a schematic block diagram illustrating a suitable operating environment in accordance with various aspects and embodiments.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13104), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1005 may include at least one of an encoder or decoder, wherein the at least one of an encoder or decoder may consist of hardware, a combination of hardware and software, or software. Although, codec 1005 is depicted as a separate component, codec 1005 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s). Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
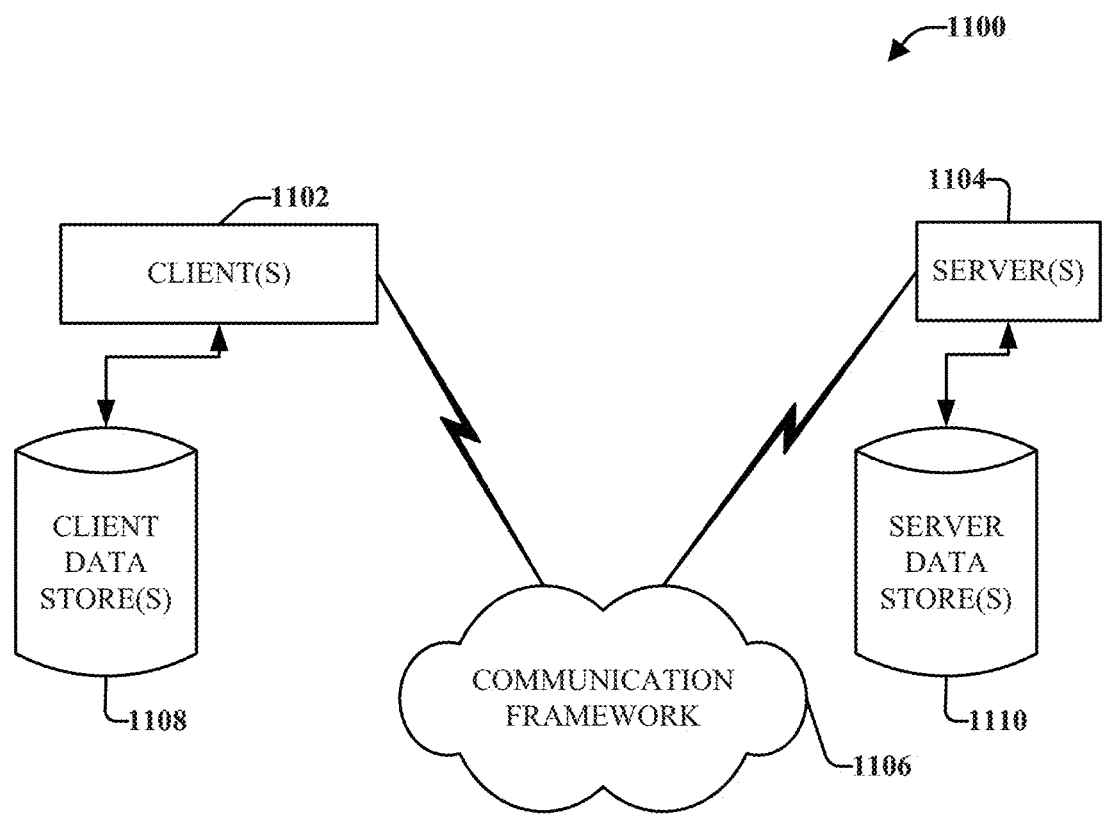
FIG. 11 is a schematic block diagram of a sample-computing environment in accordance with various aspects and embodiments.

Referring now to FIG. 11, there is illustrated a schematic block diagram of a computing environment 1100 in accordance with this disclosure. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a metadata, e.g., associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 include or are operatively connected to one or more client data store(s) 1108 that can be employed to store information local to the client(s) 1102 (e.g., associated contextual information). Similarly, the server(s) 1104 are operatively include or are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
   a memory; and
   a hardware processor that, when executing computer executable instructions stored in the memory:
   presents a first media item hosted by a media source, wherein a request to present the first media item was received in response to a selection of a link associated with the first media item at a referral source and wherein the referral source is different from the media source;
   determines a location associated with the device that posted the link to the first media item at a time the link was posted at the referral source;
   identifies a second media item from a plurality of media items that are hosted by the media source, wherein the second media item is identified based on a determination that the second media item was referred to other users through the referral source and was selected by the other users for presentation at the media source, and (ii) the location associated with the device that posted the link to the first media item at the time the link was posted; and
   causes a recommendation to be presented in a user interface that includes the second media item.

2. The system of claim 1, wherein the request is associated with a user account and wherein the hardware processor is further configured to identify a plurality of user accounts connected to the user account.

3. The system of claim 2, wherein the hardware processor further:
   selects a second user account from the plurality of user accounts, wherein the second user account has included the link to the first media item in a first social networking post hosted by the referral source; and
   determines that the second user account has included a second link to the second media item in a second social networking post hosted by the referral source.

4. The system of claim 3, wherein the second media item is identified based on a determination that the second user account has included the second link to the second media item in the second social networking post.

5. The system of claim 3, wherein the second media item is identified based on a time at which the second social networking post including the second link was posted at the referral source.

6. The system of claim 3, wherein the second user account is selected based on a watch history associated with the second user account at the media source.

7. A method comprising:
   presenting, using a hardware processor, a first media item hosted by a media source, wherein a request to present the first media item was received in response to a selection of a link associated with the first media item at a referral source and wherein the referral source is different from the media source;
   determining, using the hardware processor, a location associated with the device that posted the link to the first media item at a time the link was posted at the referral source;
   identifying, using the hardware processor, a second media item from a plurality of media items that are hosted by the media source, wherein the second media item is identified based on (i) a determination that the second media item was referred to other users through the referral source and was selected by the other users for presentation at the media source, and (ii) the location associated with the device that posted the link to the first media item at the time the link was posted; and
   causing, using the hardware processor, a recommendation to be presented in a user interface that includes the second media item.

8. The method of claim 7, wherein the request is associated with a user account and wherein the hardware processor is further configured to identify a plurality of user accounts connected to the user account.

9. The method of claim 8, further comprising:
   selecting a second user account from the plurality of user accounts, wherein the second user account has included the link to the first media item in a first social networking post hosted by the referral source; and
   determining that the second user account has included a second link to the second media item in a second social networking post hosted by the referral source.

10. The method of claim 9, wherein the second media item is identified based on a determination that the second user account has included the second link to the second media item in the second social networking post.

11. The method of claim 9, wherein the second media item is identified based on a time at which the second social networking post including the second link was posted at the referral source.

12. The method of claim 9, wherein the second user account is selected based on a watch history associated with the second user account at the media source.

13. A non-transitory computer-readable medium containing computer-executable instructions that, when executed by a processor, cause the processor to perform a method, the method comprising:
   presenting a first media item hosted by a media source, wherein a request to present the first media item was received in response to a selection of a link associated with the first media item at a referral source and wherein the referral source is different from the media source;
   determining a location associated with the device that posted the link to the first media item at a time the link was posted at the referral source;
   identifying a second media item from a plurality of media items that are hosted by the media source, wherein the second media item is identified based on (i) a determination that the second media item was referred to other users through the referral source and was selected by the other users for presentation at the media source, and (ii) the location associated with the device that posted the link to the first media item at the time the link was posted; and causing a recommendation to be presented in a user interface that includes the second media item.

14. The non-transitory computer-readable medium of claim 13, wherein the request is associated with a user account and wherein the hardware processor is further configured to identify a plurality of user accounts connected to the user account.

15. The non-transitory computer-readable medium of claim 14, wherein the method further comprises:

selecting a second user account from the plurality of user accounts, wherein the second user account has included the link to the first media item in a first social networking post hosted by the referral source; and determining that the second user account has included a second link to the second media item in a second social networking post hosted by the referral source.

16. The non-transitory computer-readable medium of claim 15, wherein the second media item is identified based on a determination that the second user account has included the second link to the second media item in the second social networking post.

17. The non-transitory computer-readable medium of claim 15, wherein the second media item is identified based on a time at which the second social networking post including the second link was posted at the referral source.

18. The non-transitory computer-readable medium of claim 15, wherein the second user account is selected based on a watch history associated with the second user account at the media source.

* * * * *